United States Patent
Baek

(10) Patent No.: US 7,830,843 B2
(45) Date of Patent: Nov. 9, 2010

(54) METHOD FOR ALLOCATING IP ADDRESS IN A MOBILE COMMUNICATION SYSTEM

(75) Inventor: Woo-Hyun Baek, Seoul (KR)

(73) Assignee: Samsung Electronics Co., Ltd (KR)

( * ) Notice: Subject to any disclaimer, the term of this patent is extended or adjusted under 35 U.S.C. 154(b) by 1219 days.

(21) Appl. No.: 11/367,523

(22) Filed: Mar. 3, 2006

(65) Prior Publication Data

US 2006/0198351 A1 Sep. 7, 2006

(30) Foreign Application Priority Data

Mar. 3, 2005 (KR) .................. 10-2005-0017925

(51) Int. Cl.
*H04W 4/00* (2009.01)
(52) U.S. Cl. .................. 370/338; 370/312; 370/313; 370/349; 370/379; 370/382; 709/202; 709/203; 709/226; 455/435.1; 455/435.2
(58) Field of Classification Search .............. 455/435.1, 455/435.2; 370/312, 313, 349, 379, 382, 370/383, 389, 392, 393, 395.54, 474, 475, 370/338; 709/203, 217–219, 226, 202
See application file for complete search history.

(56) References Cited

U.S. PATENT DOCUMENTS

| 2003/0097447 A1* | 5/2003 | Johnston ................ 709/227 |
| 2004/0028005 A1* | 2/2004 | Rajaniemi et al. ........... 370/320 |
| 2004/0121781 A1* | 6/2004 | Sammarco ............... 455/456.1 |
| 2005/0020308 A1* | 1/2005 | Lai ........................... 455/558 |

\* cited by examiner

*Primary Examiner*—Wayne Cai
(74) *Attorney, Agent, or Firm*—The Farrell Law Firm, LLP

(57) ABSTRACT

Disclosed is a method for allocating an IP address. The interface ID value of an IP address allocated to a mobile terminal upon IP communication in a mobile communication system is set by using country information, mobile network information and a telephone number stored in the mobile terminal. The mobile terminal enables IP communication with a receiving-side mobile terminal even if the mobile terminal has information related to only the telephone number of the receiving-side mobile terminal.

9 Claims, 6 Drawing Sheets

METHOD FOR ALLOCATING IP ADDRESS IN A MOBILE COMMUNICATION SYSTEM

PRIORITY

This application claims the benefit under 35 U.S.C. 119(a) of an application entitled "Method For Allocating IP Address In Mobile Communication System" filed in the Korean Intellectual Property Office on Mar. 3, 2005 and assigned Serial No. 2005-17925, the entire contents of which are incorporated herein by reference.

BACKGROUND OF THE INVENTION

1. Field of the Invention

The present invention relates to Internet protocol (IP) communication in a mobile communication system, and more particularly to a method for allocating an IPv6-type IP address by using the telephone number of a mobile terminal when IP communication is performed.

2. Description of the Related Art

As the popularization and development of mobile communication systems increases, various IP communications for use therewith are also being realized. The IP communications include, among others, communications using Digital Video Broadcasting-Handheld Devices (DVB-H), Voice over IP (VoIP) and a Wireless Local Area Network (WLAN). In order to realize such IP communication, it is necessary to allocate an IP address to a mobile terminal. An Internet Protocol Version 6 (IPv6)-type IP address for IP communication includes a fixed value, a geographic address and an interface identification (ID). The fixed value and geographic address are set according to the types of communication companies and the location information of a mobile terminal, and the interface ID is determined by the mobile terminal as shown in FIG. 1. FIG. 1 is a diagram illustrating the structure of a conventional interface ID field of an IP address in which an interface ID value is set. The interface ID field 200 includes a Type Approval Code (TAC) field 201, an Final Assembly Code (FAC) field 203, an Serial Number (SNR) field 205 and an Software Version Number (SVN) field 207. The values of the fields are set by using an international mobile equipment identity connection (IMEI) for mobile terminals. That is, a 6-digit type approval code is recorded in the TAC field 201, a 2-digit final assembly code is recorded in the FAC field 203, a 6-digit serial number is recorded in SNR field 205, and a 2-digit software version number is recorded in SVN field 207.

The interface ID value determined based on the IMEI as described above has a very complicated structure, and disables sharing location information among the DVB-H, WLAN and VoIP communications because the interface ID value is determined based on a base station. For example, although a mobile terminal communicating with a base station by means of IP enters a WLAN AP (Access Point) service area, the WLAN AP cannot directly access the mobile terminal. Thus, a new IP address must be allocated from the mobile communication system in order to have access to the mobile terminal. In this case, an IP address of an entirely different address system may be allocated. When an originating caller who desires to call to a personal computer or a VoIP terminal has not recognized the IP address of a receiving-side terminal in advance, there is no way for the transmitting-side terminal to know the address system of the receiving-side terminal as described above. Therefore, it is impossible for the calls of the originating caller to reach the user of the corresponding phone using the VoIP service.

SUMMARY OF THE INVENTION

Accordingly, the present invention has been made to solve the above-mentioned problems occurring in the prior art, and an object of the present invention is to provide a method for allocating IP addresses which can be easily recognized.

To accomplish this object, in accordance with one aspect of the present invention, there is provided a method that includes setting a value of the interface ID of the IP address in a mobile terminal by using stored country information, mobile network information and a telephone number corresponding to the mobile terminal, and setting the fixed value of the IP address by using stored global area information corresponding to the mobile terminal in order to perform IP communication, transmitting the IP address, in which the interface ID value and the fixed value have been set, from the mobile terminal to a mobile switching center, and setting the geographic address of the IP address at the mobile switching center by obtaining location information of the mobile terminal, thereby completing the IP address.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments according to the present invention will be described with reference to the accompanying drawings. In the following description of the embodiments of the present invention, a detailed description of known functions and configurations incorporated herein will be omitted when it may obscure the subject matter of the present invention.

Figure 1:
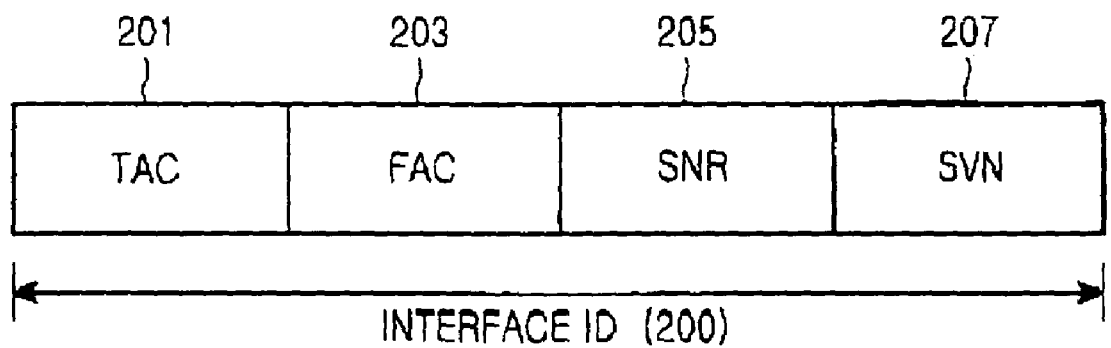
FIG. 1 is a diagram illustrating the structure of a conventional interface ID.
Figure 2:
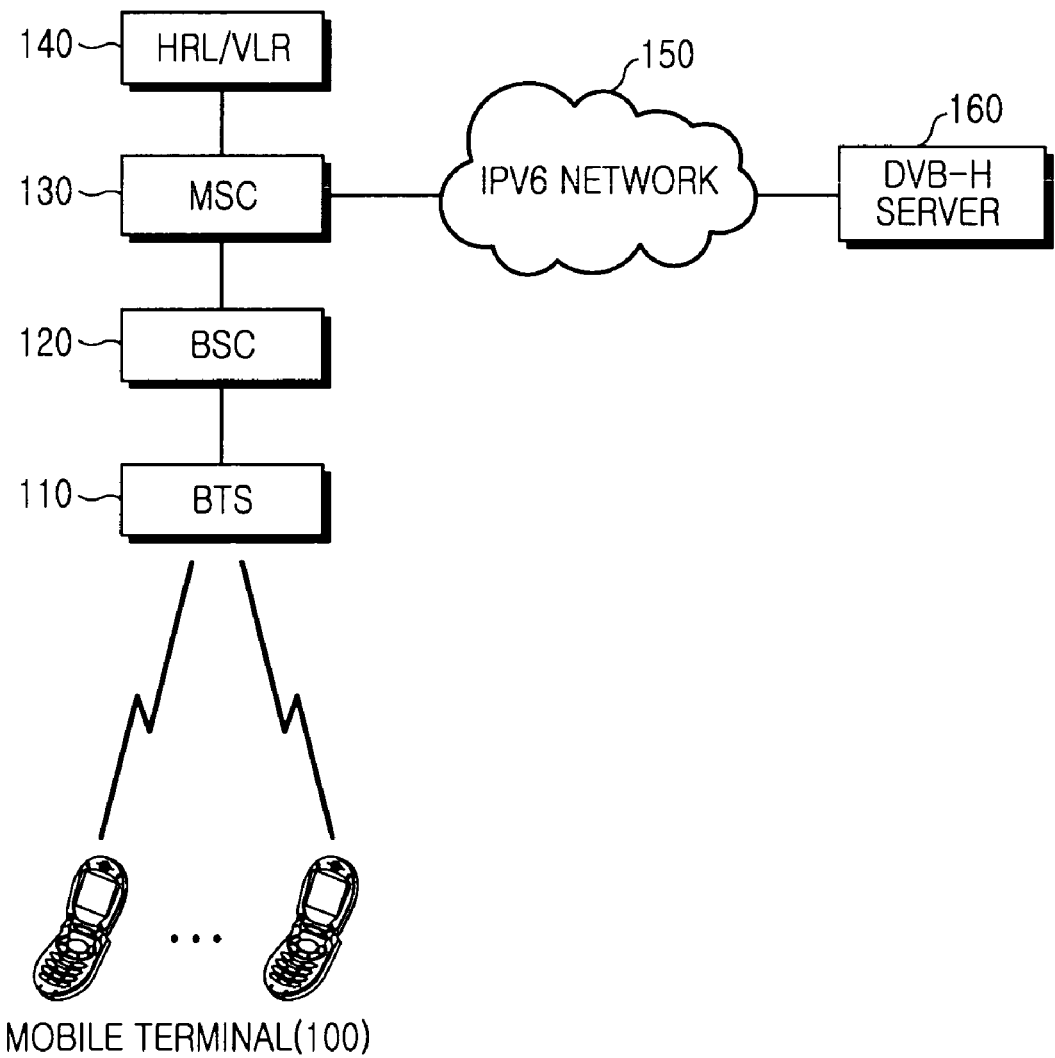
FIG. 2 is a block diagram illustrating the configuration of a mobile communication system to which the present invention is applied.

FIG. 2 is a block diagram illustrating the configuration of a mobile communication system to which the present invention is applied. The mobile communication system includes a mobile terminal 100, a base transceiver station (BTS) 110, a base station controller (BSC) 120, a mobile switching center (MSC) 130, a home location register/visitor location register (HLR/VLR) 140, an IPv6 network 150, and a Digital Video Broadcasting-Handheld Devices (DVB-H) server 160.

The BTS 110 wirelessly communicates with the mobile terminal 100. The BSC 120 controls wireless and wire links, and performs a handoff function for maintaining the continuity of communication while a subscriber is moving. Also, the BSC 120 transmits the location data and state data of a mobile terminal, which have been received from the BTS 110, to the MSC 130.

The MSC 130 cooperates with another MSC through a network in order to process the transmission/reception requests of the mobile terminal 100, and inquires of the HLR/VLR 140 about subscribers. In addition, the MSC 130 stores the state data and location information according to location registration, which has been received from the BSC 120, to the HLR/VLR 140.

The HLR/VLR 140 is a computer mainly serving as a subscriber information processing apparatus, and stores location information of multiple mobile terminals receiving a mobile communication service. In addition, the HLR/VLR 140 stores information required for authentication processing for each mobile terminal and basic information required for performing mobile communication, while storing information such as a mobile country code, a mobile network code and a global area code, corresponding to each mobile terminal. Location information of each mobile terminal stored in the HLR/VLR 140 may be provided to another server or communication system connected to the mobile communication system as needed. For example, when the DVB-H. server 160 requests location information of a mobile terminal, the MSC 130 transmits location information stored in the HLR/VLR 140 to the DVB-H server 160.

The IPv6 network 150 enables IP communication between the MSC 130 and the DVB-H server 160.

According to an embodiment of the present invention, the DVB-H server 160 provides a digital multimedia broadcasting service through IP communication with the mobile terminal 100.

Figure 3:
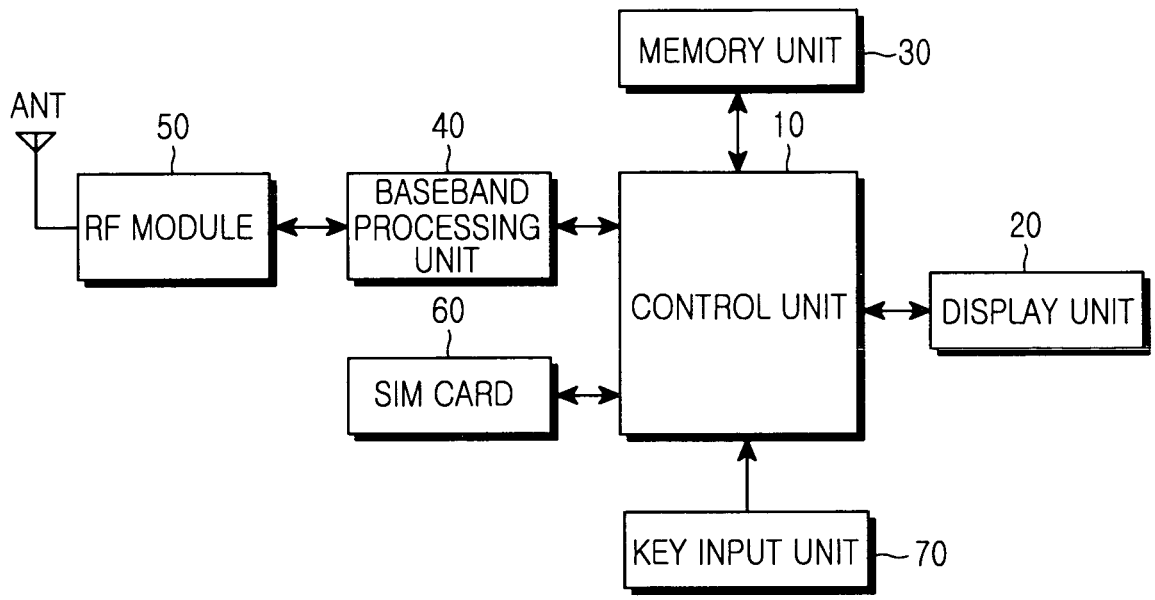
FIG. 3 is a block diagram illustrating the configuration of a mobile terminal to which the present invention is applied.

The mobile terminal 100 wirelessly communicates with the BTS 110, and performs various communication services provided from the mobile communication system. Also, the mobile terminal 100 sets an interface ID field of an IP address by using country information, network information and telephone information stored according the present invention, and performs IP communication. The configuration of such a mobile terminal is shown in FIG. 3. FIG. 3 is a block diagram illustrating the configuration of a mobile terminal to which the present invention is applied. The mobile terminal 100 includes a control unit 10, a display unit 20, a memory unit 30, a baseband processing unit 40, an RF module 50, and a key input unit 70.

The display unit 20 displays various image information and data information either received from the BTS 110 or stored in the memory unit 30 on a screen according to the control of the control unit 10.

The RF module 50 transmits/receives wireless signals to/from the BTS 110 through an antenna. That is, the RF module 50 modulates a transmission signal input through the baseband processing unit 40 from the control unit 10 to transmit an RF signal through an antenna, and demodulates an RF signal received through an antenna to provide the demodulated signal to the control unit 10 through the baseband processing unit 40. The baseband processing unit 40 processes baseband signals transferred between the RF module 50 and the control unit 10.

The key input unit 70 includes numeric keys of 0 to 9, symbol keys of '*' and '#', direction keys, and a plurality of function keys such as 'menu', 'select', 'send', 'delete', 'power on/off' and volume, corresponding to multiple functions of a mobile terminal. The key input unit 70 provides key input data corresponding to a key pressed by a user to the control unit 10.

The memory unit 30 stores a program for a processing operation and control of the control unit 10, reference data, various maintenance data which can be updated, various multimedia data, etc., and provides the stored program and data to a working memory of the control unit 10. In addition, the memory unit 30 stores program data in relation to an IP address allocation procedure according to the present invention.

The control unit 10 controls the entire operation of the mobile terminal 100, and sets an IP address by using information stored in a subscriber identification module (SIM card) 60 according to an IP communication request.

The SIM card 60 stores user authentication information, communication encryption information and various user information. Also, the SIM card 60 stores an international mobile subscriber identity (IMSI). The IMSI includes 15 digits in total, that is, a 3-digit mobile country code (MCC), a 2-digit mobile network code (MNC), and a 10-digit mobile subscriber identification number (MSIN). Values of the MCC and MNC stored in the SIM card 60 are determined based on a protocol, and are illustrated in Table 1.

TABLE 1

| MCC | Mobile Country | MNC | Mobile Network |
|-----|----------------|-----|----------------|
| 505 | Australia | 01 | Telecom Australia |
| 262 | Germany | 01 | D1-telecom |
| 262 | Germany | 02 | D2 privat |
| 222 | Italy | 01 | I SIP |
| 204 | The Netherlands | 08 | NL PTT |

Although Table 1 shows mobile country codes of four countries and five mobile network codes for mobile networks used in the above countries, a dedicated mobile country code is allocated to every country and a dedicated mobile network code is allocated to every mobile network providing service in each country.

When receiving an IP communication request from the user, the mobile terminal 100 sets an interface ID value and a fixed value of an IP address by using country information, mobile network information and a telephone number stored in the mobile terminal 100 in advance, and sets the value of a geographic address through the mobile communication system, thereby determining the IP address to perform IP communication.

Figure 4:
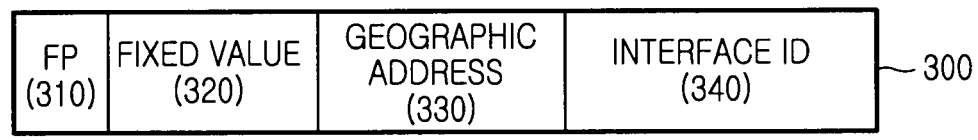
FIG. 4 is a diagram illustrating the structure of an IP address according to an embodiment of the present invention.

Such an IP address may be configured as shown in FIG. 4. FIG. 4 is a diagram illustrating the structure of an IP address according to an embodiment of the present invention. The IP address 300 includes an FP 310 always having the unchangeable value of "001", a fixed value 320, a geographic address 330 and an interface ID 340. The structure of the fixed value 320 is shown in FIG. 6A, the structure of the geographic address 330 is shown in FIG. 6B and the structure of the interface ID 340 is shown in FIGS. 5A and 5B.

First, the structure of the interface ID 340 and values set in the interface ID 340 will be described with reference to FIGS. 5A and 5B according to an embodiment of the present invention. FIG. 5A is a diagram illustrating the structure of the interface ID 340 according to an embodiment of the present invention, and FIG. 5B is a diagram illustrating the interface ID 340 set according to an embodiment of the present invention.

Figure 5A:
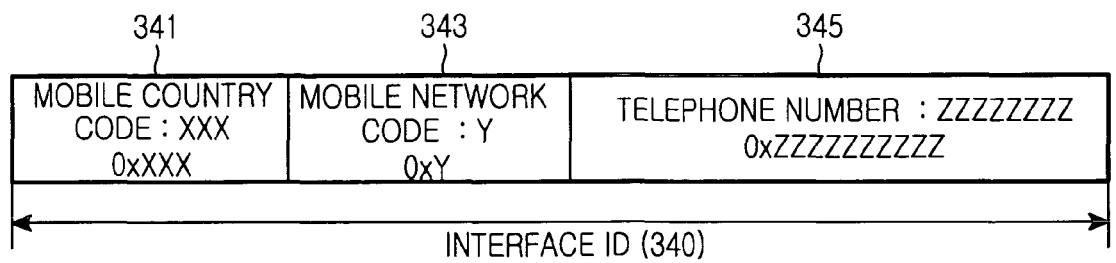
FIG. 5A is a diagram illustrating the structure of the interface ID according to an embodiment of the present invention.
Figure 5B:
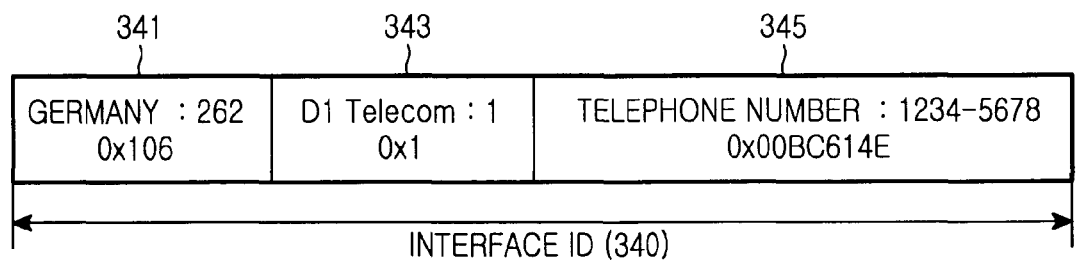
FIG. 5B is a diagram illustrating the interface ID set according to an embodiment of the present invention.
Figure 6A:
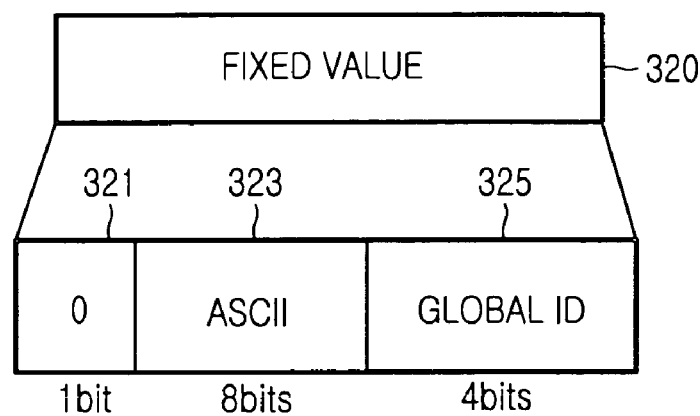
FIG. 6A is a diagram illustrating the structure of a fixed value according to an embodiment of the present invention.
Figure 6B:
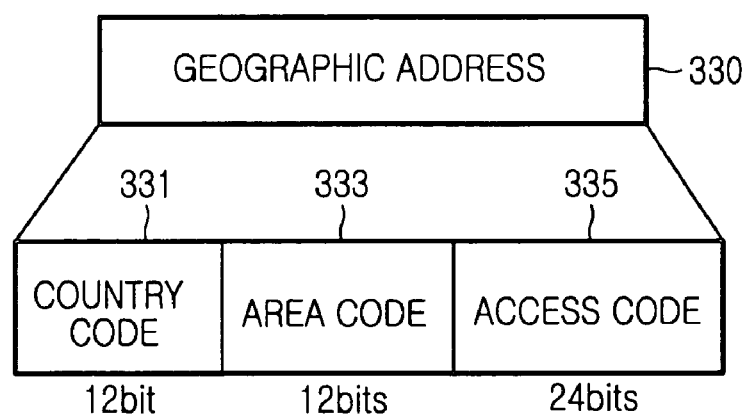
FIG. 6B is a diagram illustrating the structure of a geographic address according to an embodiment of the present invention.

As shown in FIG. 5A, the interface ID 340 includes a mobile country code 341, a mobile network code 343 and a telephone number 345. The value of the interface ID 340 is determined depending on country information, mobile network information and a telephone number in relation to the mobile terminal 100.

The value of the mobile country code 341 corresponds to the country to which the mobile terminal 100 belongs, and is set as a mobile country code stored in the SIM card 60. In this case, the actual value set as the mobile country code 341 can be variously converted depending on the embodiment. According to one embodiment of the present invention, the value set as the mobile country code 341 is converted into a 12-bit hexa value "0×XXX". That is, a corresponding mobile country code from among the mobile country codes recorded in Table 1 is converted into a 12-bit hexa value to be determined as the mobile country code 341.

The value of the mobile network code 343 is set a mobile network code stored in the SIM card 60, which corresponds to the mobile network providing service to the mobile terminal 100. In this case, the actual value set as the mobile network code 343 can be variously converted depending on the embodiment. According to an embodiment of the present invention, the value set as the mobile network code 343 is converted into a 4-bit hexa value "0×Y". That is, a corresponding mobile network code from among the mobile network codes recorded in Table 1 is converted into a 4-bit hexa value to be determined as the value of the mobile network code 343.

The value of the telephone number 345 is set as the telephone number of the mobile terminal 100. In this case, the actual value set as the telephone number 345 can be variously converted depending on the embodiment. According to one embodiment, the value set as the telephone number 345 is converted into a 5-byte hexa value "0×ZZZZZZZZZZ". That is, a corresponding telephone number is converted into a 5-byte hexa value to be set as the value of the telephone number 345.

Therefore, the value of the interface ID 340 is set as '0×03 XX XY ZZ ZZ ZZ ZZ ZZ', where '0×03' is a fixed value of the first byte of the interface ID based on the interface ID standard.

When a mobile terminal receives service from the D1-telecom of Germany and has a telephone number of '1234-5678', the interface ID value set in the interface ID 340 of the mobile terminal 100 is '03-106-1-0000BC614E'. That is, the value of the mobile country code 341 is '0×106' since the mobile country code for Germany is '262', the value of the mobile network code 343 is '0×1' since the mobile network code for the DD1-telecom is '01', and the value of the telephone number 345 is '0×0000BC614E'. Accordingly, the interface ID value set in the interface ID 340 becomes '03-106-1-0000BC614E', which is shown in FIG. 5B.

As described above, the value of the interface ID 340 of the IP address 300 is determined by using the country information, mobile network information and telephone number which have been pre-stored in the mobile terminal.

Next, the structure of the fixed value 320 and the value set as the fixed value 320 will be described with reference to FIG. 6A. The fixed value 320 includes an eigenvalue 321, an ASCII character 323 and a global ID 325. The eigenvalue 321 is set as "zero" (1 bit). The ASCII character 323 is set as "+" (0×2B) of 8 bits which is a code defined by the Internet engineering task force (IEFT).

The global ID 325 is set as 4-bit global area code defined by the Internet assigned number authority (IANA). For examples of the global area code, there is '0001' for South America, '0010' for Africa, '0011' for Europe, '0101' for Latin America, '0110' for Asia and Australia, '0111' for Russia, '1000' for Asia, and '1001' for India and the Middle East.

Next, the value of the geographic address 330 is determined according to location information of the mobile terminal 100. Since the location information of the mobile terminal 100 is stored in the mobile communication system, the value of the geographic address 330 is set by the mobile communication system. Therefore, the mobile terminal 100 transmits an IP address, in which the value of the interface ID 340 and the fixed value 320 have been set, together with an IP communication request to the mobile communication system. The MSC 130 of the mobile communication system obtains the location information of the mobile terminal 100 through the HLR/VLR 140 and sets the value of the geographic address 330.

FIG. 6B is a diagram illustrating the structure of the geographic address 330 according to an embodiment of the present invention. The geographic address 330 includes a country code 331, an area code 333 and an access code 335.

The values of the country code 331, area code 333 and access code 335 change, depending on the area in which the mobile terminal 100 is located and the BTS to which the mobile terminal 100 is connected. The location of the mobile terminal 100 is checked by the BTS 110 and is continuously updated in the HLR/VLR 140 through the BSC 120 and MSC 130, when the mobile terminal 100 is ON/OFF, when the mobile terminal 100 moves out of the BTS 110, or every predetermined period of time. Therefore, the MSC 130 can set the correct values of the country code 331, area code 333 and access code 335.

Figure 7:
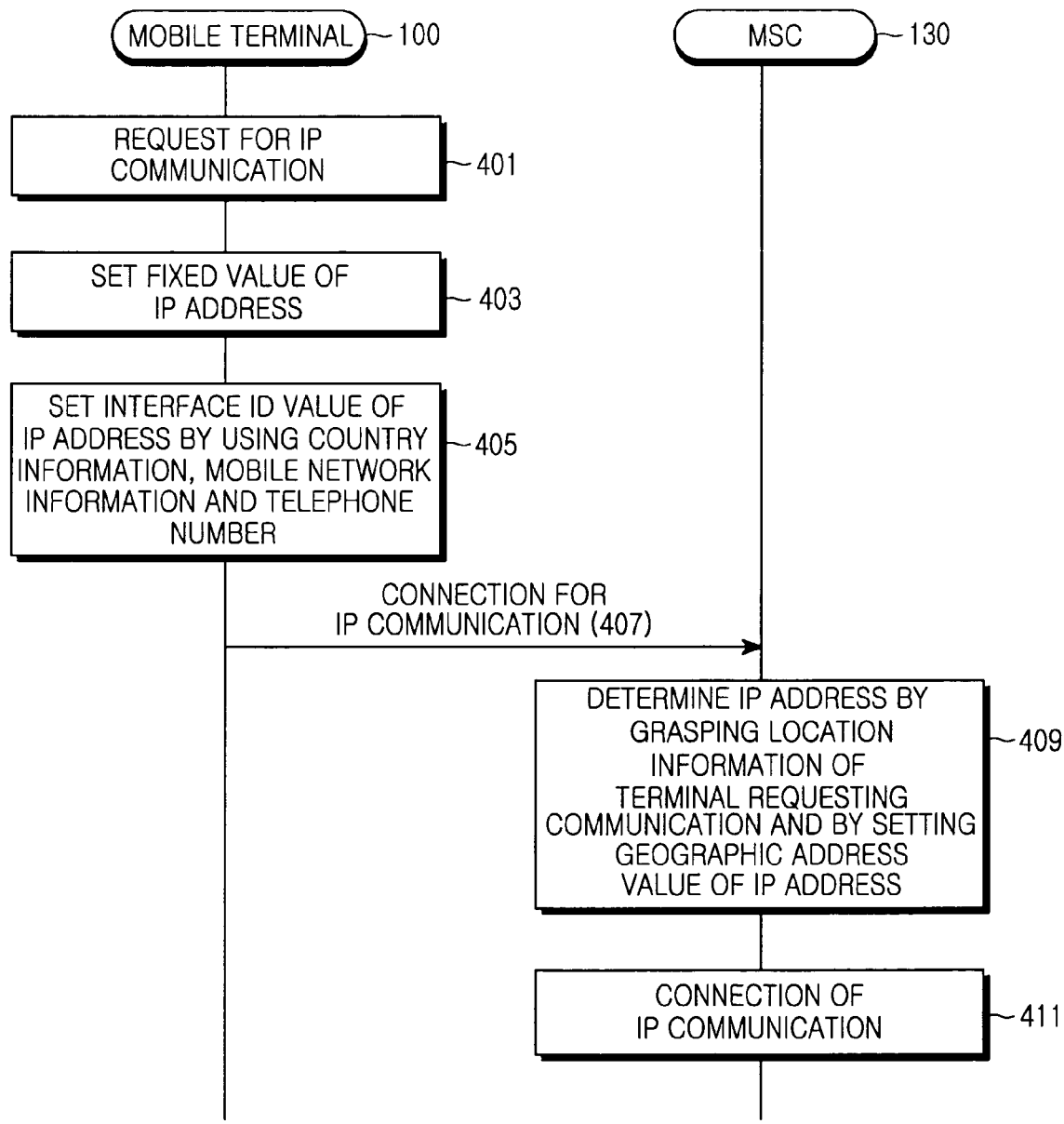
FIG. 7 is a flowchart illustrating a procedure for allocating an IP address according to an embodiment of the present invention.

FIG. 7 is a flowchart illustrating a procedure for allocating an IP address according to an embodiment of the present invention. When the control unit 10 of the mobile terminal 100 is requested to perform IP communication with the DVB-H server 160 from the user in step 401, the control unit 10 proceeds to step 403. In step 403, the mobile terminal 100 sets the fixed value 320 of the IP address 300 by using a pre-stored global area code, and then proceeds to step 405. In step 405, the control unit 10 sets the interface ID value of the IP address by using the pre-stored mobile country code, mobile network code and telephone number, and then proceeds to step 407. In step 407, the control unit 10 transmits an IP communication request message including the IP address to the MSC 130. The MSC 130 obtains the location information of the mobile terminal 100 according to the IP communication request of the mobile terminal 100, sets a geographic address value of the received IP address to determine the IP address, and then proceeds to step 411. In step 411, the MSC 130 connects IP communication between the mobile terminal 100 and the DVB-H server 160 by using the set IP address.

The embodiment described with reference to FIG. 7 has been made with respect to a procedure for allocating an IP address for only a transmitting-side terminal on the assumption that the transmitting-side terminal has already known the IP address of its counterpart apparatus, i.e., the DVB-H server 160. However, when allocating an IP address according to the present invention, if a transmitting-side mobile terminal knows the telephone number of its counterpart mobile terminal without knowing the IP address of the counterpart mobile terminal, IP communication can be achieved. The MSC 130 can search for the global area code, mobile country code, mobile network code and location information of a mobile terminal registered in the HLR/VLR 140. Therefore, when the MSC 130 receives the telephone number of a transmitting-side mobile terminal together with an IP communication request from a receiving-side mobile terminal, the MSC 130 searches for the global area code, mobile country code, mobile network code and location information of the corresponding mobile terminal, thereby allocating the IP address for the receiving-side mobile terminal by using the received telephone number.

Therefore, the mobile terminal can perform IP communication with a counterpart mobile terminal even when it only knows the telephone number of the counterpart mobile terminal.

While the present invention has been shown and described with reference to certain preferred embodiments thereof, it will be understood by those skilled in the art that various changes in form and details may be made therein without departing from the spirit and scope of the invention as defined by the appended claims. For example, although the above description regards a mobile terminal having a subscriber identification module (SIM) card, the present invention can be applied to mobile terminals of other communication schemes which do not have a SIM card. That is, since a mobile terminal has basically stored the country information and network information thereof in advance although the mobile terminal does not use a SIM card, the IP address allocation according to the present invention can be achieved. Accordingly, the scope of the invention is not to be limited by the above embodiments but by the claims and the equivalents thereof.

What is claimed is:

1. A method for allocating an Internet protocol (IP) address of a mobile terminal in a mobile communication system, the method comprising the steps of:
   generating, by the mobile terminal, a partial IP address by
      setting a value of an interface identification (ID) of the partial IP address using stored country information, mobile network information and a telephone number corresponding to the mobile terminal, and
      setting a fixed value of the partial IP address using stored global area information corresponding to the mobile terminal;
   transmitting an IP communication request message including the partial IP address including the interface ID and the fixed value from the mobile terminal to a mobile switching center; and
   generating, by the mobile switching center, a complete IP address by setting a geographic address of the partial IP address by obtaining location information of the mobile terminal.

2. The method as claimed in claim 1, wherein the fixed value and the values of the interface ID and the geographic address are converted into hexa values and set as the converted hexa values.

3. The method as claimed in claim 1, wherein the mobile switching center connects IP communication between the mobile terminal and a counterpart mobile terminal using the completed IP address.

4. A method for allocating an Internet protocol (IP) address of a mobile terminal in a mobile communication system, the method comprising the steps of:
   generating, by the mobile terminal, a partial IP address by
      setting a value of an interface identification (ID) of the partial IP address by using a mobile country code, a mobile network code and a telephone number stored in a subscriber identification module (SIM) card, and
      setting a fixed value of the partial IP address using a stored global area code;
   transmitting an IP communication request message including the partial IP address including the interface ID and the fixed value from the mobile terminal to a mobile switching center; and
   generating, by the mobile switching center, a complete IP address by setting a geographic address of the partial IP address by obtaining location information of the mobile terminal.

5. The method as claimed in claim 4, wherein the fixed value and the values of the interface ID and the geographic address are converted into hexa values and set as the converted hexa values.

6. A method for allocating an Internet protocol (IP) address of a mobile terminal in a mobile switching center, the method comprising the steps of:
   when a mobile communication system receives an IP communication request message including a telephone number of a counterpart mobile terminal from a transmitting-side terminal, setting, by the mobile switching center, a value of an interface identification (ID) of an IP address by using country information, mobile network information and the telephone number having been stored in and corresponding to the counterpart mobile terminal for IP communication;
   setting, by the mobile switching center, a fixed value of the IP address by using stored global area information;
   setting, by the mobile switching center, a geographic address of the IP address by obtaining location information of the counterpart mobile terminal, thereby completing the IP address; and
   connecting IP communication between the transmitting-side terminal and the counterpart mobile terminal by using the completed IP address.

7. The method as claimed in claim 6, wherein the fixed value and the value of the interface ID and the geographic address are converted into hexa values and set as the converted hexa values.

8. A mobile communication system for allocating an Internet Protocol (IP) address of a mobile terminal, the system comprising:
   a mobile terminal for generating a partial IP address by setting a value of an interface identification (ID) of the partial IP address using stored country information, mobile network information and a telephone number corresponding to the mobile terminal, setting a fixed value of the partial IP address using stored global area information corresponding to the mobile terminal, and for transmitting an IP communication request message including the partial IP address including the interface ID and the fixed value from the mobile terminal to a mobile switching center; and
   the mobile switching center for generating a complete IP address by setting a geographic address of the partial IP address by obtaining location information of the mobile terminal.

9. A mobile communication system for allocating an Internet Protocol (IP) address of a mobile terminal, the system comprising:
   a mobile terminal for generating a partial IP address by setting a value of an interface identification (ID) of the partial IP address using a mobile country code, a mobile network code and a telephone number stored in a subscriber identification module card, setting a fixed value of the partial IP address using a stored global area code, and for transmitting an IP communication request message including the partial IP address including the interface ID and the fixed value from the mobile terminal to a mobile switching center; and
   the mobile switching center for generating a complete IP address by setting a geographic address of the partial IP address by obtaining location information of the mobile terminal.

* * * * *